United States Patent [19]
Ahmed

[11] 3,941,940
[45] Mar. 2, 1976

[54] TRANSIENT SUPPRESSOR
[75] Inventor: Adel Abdel Aziz Ahmed, Annandale, N.J.
[73] Assignee: RCA Corporation, New York, N.Y.
[22] Filed: Dec. 6, 1974
[21] Appl. No.: 530,403

[52] U.S. Cl. .............. 179/18 GF; 307/231; 357/51
[51] Int. Cl.². H04M 3/00; H03K 5/20; H01L 21/00
[58] Field of Search ........ 179/18 GF; 307/241, 242, 307/246, 294, 303, 93, 252 K, 243, 231, 234; 357/51; 340/166 R

[56] References Cited
UNITED STATES PATENTS

| | | |
|---|---|---|
| 3,456,084 | 7/1969 | Haselton, Jr. .................... 179/18 GF |
| 3,500,140 | 3/1970 | Makimoto et al. .................... 357/51 |
| 3,567,966 | 3/1971 | Gilbert et al. ........................ 307/231 |

Primary Examiner—Thomas A. Robinson
Attorney, Agent, or Firm—H. Christoffersen; S. Cohen; A. L. Limberg

[57] ABSTRACT

A diode OR gate permits trigger circuits of an array of SCR's to share the same integrating capacitor for suppression of short-lived transients, which might otherwise cause false triggering of the SCR's. The SCR's are switching and latching elements in a telephone cross-point switch array.

7 Claims, 1 Drawing Figure

U.S. Patent   March 2, 1976   3,941,940
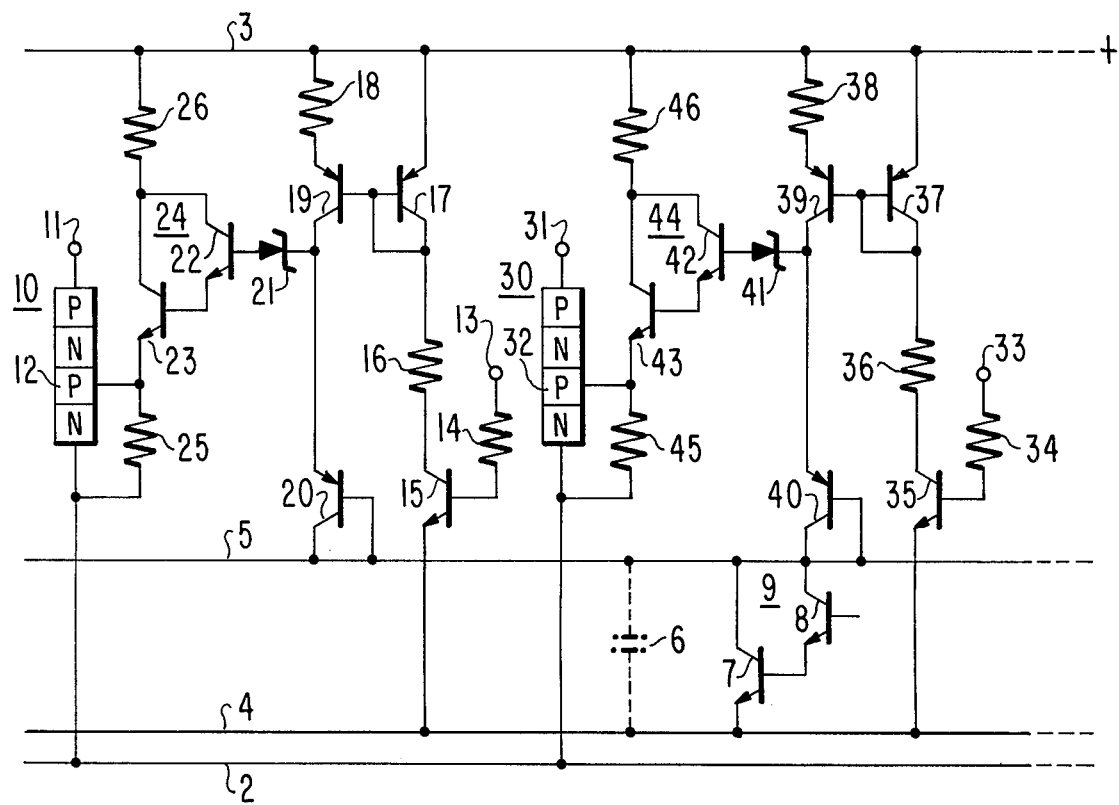

TRANSIENT SUPPRESSOR

The present invention relates to telephone cross-point switching arrays using four-layer semiconductor devices as cross-point elements and, more particularly, to transient suppression circuitry for the trigger circuits of these devices.

Telephone cross-point switch arrays are more and more being constructed in monolithic integrated circuit form. The switching and latching function in such circuits is most feasibly provided by air-isolated semiconductor controlled rectifiers (SCR's) each of which is triggered by a command signal. These command signals are supplied by respective command lines. Each of these lines undesirably tends to have short-lived transients, typically no more than 30 microseconds in duration, coupled to it by stray capacitances. The command signal pulses are of longer duration, at least 100 microseconds.

Low-pass filtering of each of the command lines would suppress the short-lived transients while preserving the larger-duration command signal pulse. The problem is to provide low-pass filtering for each of the command lines which will not take up excessive area on the monolithic integrated circuit die. This problem is solved by connecting the input terminals of a diode OR gate to each of the command lines so the shared capacitance at the output terminal of the OR gate can provide filtering for each of the command lines.

In the drawing, the sole FIGURE is a schematic diagram of a portion of a cross-point array with SCR switching and latching elements, their associated trigger circuitry and the transient suppression circuitry in which the present invention is embodied.

In the interest of brevity and clarity, only two-cross-point switch elements (SCR's 10 and 30) and their associated circuitry are shown in the FIGURE and described in the following detailed description of the invention. However, in actual practice there are customarily several (e.g., eight) cross-point switch elements in each integrated circuit cross-point switch array.

Each of the SCR's 10 and 30 has its cathode connected to a ROW bus 2, of the cross-point switch. The anodes of SCR's 10 and 30 are provided terminals 11 and 31, respectively, for connection to separate COLUMN busses (not shown) of the cross-point switch. Bus 3 is supplied a direct potential, positive with respect to that appearing on ROW bus 2; and bus 4 is supplied a direct potential about the same as the potential appearing on ROW 2. Each SCR may be triggered into conduction by the application of a positive-going pulse of current to its gate electrode (12 or 32), and each thereafter remains conductive until current flow to its anode terminal (11 or 31) is either interrupted or reduced below the SCR holding current.

Terminals 13 and 33 are for connection of command lines to apply a positive-going pulse to SCR 10 or 30, respectively, when that SCR is to be triggered into conduction. For example, a positive-going pulse at terminal 13 is coupled through resistor 14 to the base electrode of an NPN transistor 15, switching it into saturated conduction, and clamping its collector electrode to substantially the same potential as appears on bus 4. Resistor 16 connects the collector electrode of transistor 15 to the interconnected base and collector electrodes of a self-biased PNP transistor 17 having its emitter electrode connected to bus 3. The self-biased transistor maintains a relatively constant offset potential (550 to 700 millivolts for a silicon transistor) across itself by negative collector-to-base feedback. So, for this condition of transistor 15 being biased into saturation, the potential across resistor 16 is about one volt less than that appearing between busses 4 and 3, and the current flow through resistor 16 for this condition has a well-defined value in accordance with Ohm's Law. The base-emitter potential of transistor 17 has the value associated with this current level, and is applied to the serially-connected resistor 18 and base-emitter junction of transistor 19. This biases PNP transistor 19 into conduction, albeit at a substantially lower level of collector current than that of transistors 15 and 17. Transistor 19 can be viewed as a switchable constant current source activated by COMMAND pulses or transients appearing on the COMMAND signal line (not shown) connected to terminal 13.

The collector current of transistor 19 forward biases the emitter-base junction of PNP transistor 20. Transistor 20 is self-biased and functions as a diode to couple the collector electrode of transistor 19 to a bus 5 floating in potential developed by the charge on a capacitance 6. This capacitance 6 could be provided by a specific and separate capacitor structure, that is, by a lumped element. However, the PNP transistor 20 will be of a lateral construction in a monolithic integrated circuit and so will have substantial base-to-substrate capacitance associated therewith. This base-to-substrate capacitance parallelled with those of corresponding elements (e.g. 40) in the triggering circuits of the other cross-point switch elements can provide an adequately large capacitance 6 without need for further, especial capacitor structure. This distributed capacitance is illustrated in the FIGURE by the phantom (dashed line) showing.

In operation, the collector current of transistor 19 charges capacitor 6 via self-biased transistor 20, raising the emitter potential of transistor 20. This raises the potential on bus 5 because of the clamping action of self-biased transistor 20. The raising of potential on bus 5 cuts-off the base-emitter junctions of other self-biased transistors (e.g., 40) connected to bus 5 and prevents the coupling of trigger pulses to the other SCR's (e.g., 30).

When the emitter potential of transistor 20 is raised sufficiently positive, it will overcome the threshold potential offered by the serially-connected avalanche diode 21 and base-emitter junctions of transistors 22 and 23 in Darlington connection 24. This serial connection in effect forms a threshold-potential breakdown device. Current will then flow in this serial connection as base current for transistor 23, applying current to resistor 25 and to gate electrode 12 of SCR 10. The value of this current is constrained to a limit value by resistor 26 when transistor 23 saturates. A level of current flow much lower than this limit value is, however, sufficient to trigger SCR 10 into latching conduction.

Applying a positive pulse to terminal 33 will trigger SCR 30 into latching conduction in an analogous manner, elements 34, 35, 36, 37, 38, 39, 40, 41, 42, 43, 44, 45 and 46 corresponding to elements 14, 15, 16, 17, 18, 19, 20, 21, 22, 23, 24, 25 and 26, respectively.

Now, a short-lived transient pulse of current from the collector electrode of transistor 19 during an interval between command pulses will render self-biased transistor 20 conductive and the capacitance 6 will integrate the transient pulse. Since the pulse is short-lived and the collector current of transistor 19 is constrained to a low level, capacitor 6 will be insufficiently charged to develop a potential thereacross large enough to overcome the threshold potential presented by avalanche diode 21 and the base-emitter junctions of transistors 22 and 23. So, there will be no triggering of SCR 10. Self-biased transistor 40 and capacitance 6 operate similarly to prevent triggering of SCR 30 by transient current pulses from the collector electrode of transistor 39.

Transistors 7 and 8 are connected in a Darlington configuration 9 with base-electrode of transistor 8 being left uncommitted. Darlington configuration 9 accordingly provides a high-resistance leakage path for bleeding off charge accumulated on capacitor 6 during transient pulses. Stray leakage may be sufficient for this purpose in some circuits, in which case the Darlington configuration 9 may be dispensed with.

One may consider self-biased diodes 20 and 40 as diodes in an OR gate configuration. This OR gate configuration permits a single integrating capacitance 6 which is common to the entire array to provide transient immunity to the triggering circuitry of each SCR 10, 30, while at the same time isolating the trigger pulses to one of the SCR's from the other(s). The diodes themselves as self-biased PNP lateral transistors contribute their respective base-to-substrate capacitances, which are parallelled to form an adequately large capacitance 6 without need for separate capacitive structures.

The lateral-structure transistors (20, 40, etc.) may have separate base regions in which case their respective base electrodes and their respective collector electrodes will all be connected by metallization to the floating bus 5. Alternatively, the lateral-structure transistors may share the same base region and, in such case, can use in common a single base electrode. The transistors in such case may also share a common collector region, which would permit the transistors to use in common a single collector electrode. Large threshold potentials to trigger pulses are provided by avalanche diodes 21, 41 to reduce the value of the integrating capacitance necessary to prevent false triggering of the SCR's 10, 30 by transients. The time delay before triggering achievable with this integrated circuit is reasonably uniform and predictable, facilitating mass production of the cross-point switching array.

What is claimed is:

1. In a cross-point switch array with a plurality of four-layer devices having their anode-to-cathode paths connected as switching and latching elements between COLUMN and ROW busses and having their respective gate electrodes connected to receive COMMAND pulses of current from respective COMMAND signal lines for triggering their respective anode-to-cathode paths into conduction, triggering circuitry immune to false triggering brought about by transient pulses of shorter duration than said COMMAND pulses, said triggering circuitry comprising:
    a plurality, N in number, of switchable current sources each for being activated by a COMMAND or transient pulse applied thereto from a respective COMMAND signal line;
    a diode OR gate having a plurality, N in number, of input terminals, each connected to a separate one of said switchable current sources, and having an output terminal;
    a capacitance connected between said OR gate output terminal and a point of potential to which the cathodes of said four layer devices are referred, for integrating said transient pulses; and
    a plurality, N in number, of threshold potential breakdown devices, each connected between a respective one of said OR gate input terminals and the gate electrode of a respective one of said four-layer devices, their threshold potentials for breakdown being chosen sufficiently low that COMMAND pulses as integrated by said capacitance are large enough to overcome these threshold potentials and being chosen sufficiently high that transient pulses as integrated by said capacitance are too small to overcome these threshold potentials.

2. Triggering circuitry as set forth in claim 1 wherein said diode OR gate and at least a portion of said capacitance for integrating transient pulses comprises:
    a plurality, N in number, of lateral-structure integrated transistors having their respective emitter electrodes connected as the respective input terminals of said OR gate, having their base and collector electrodes connected together as the output terminal of said OR gate, and having a substrate, their parallelled base-to-substrate capacitances providing at least a portion of said capacitance for integrating transient pulses.

3. The combination of:
    an array of semiconductor controlled rectifiers, each having a conduction path and a gate electrode for controlling conduction through said path;
    a plurality of control circuits, one for each gate controlled rectifier, each including an input terminal to which a COMMAND pulse may be applied, a current source, a normally open switch between that source and the gate electrode of its gate controlled rectifier, and means responsive to said COMMAND pulse for closing the switch of that circuit;
    integrating means for substantially attenuating pulses of shorter duration than one of said COMMAND pulses; and
    selective switching means responsive to pulses appearing at each of said input terminals for selectively applying said integrating means to the one of said control circuits having the input terminal on which the largest pulse appears to reduce the sensitivity of that control circuit to such pulse if it be of said shorter duration.

4. The combination set forth in claim 3 having a plurality of lateral geometry integrated transistors on a common substrate, having their respective emitter electrodes connected to separate ones of said control circuits and having their base and collector electrodes connected together to form an OR gate connection comprising said selective switching means, the parallelled capacitances between the base and collector regions of said transistors comprising said integrating means.

5. In combination:
    an array of electronic switch devices, each having an input circuit and an output circuit, the output circuit of each electronic switch device having a relatively conductive state and a relatively non-conductive state depending upon whether a control potential appearing at the input circuit of that electronic switch device is above or below a threshold value;

means for recurrently applying a COMMAND current pulse to a selected one of the input circuits of said electronic switch devices to cause the potential thereacross to exceed said threshold value;

a plurality of unilaterally conductive devices, each of said unilaterally conductive devices exhibiting relatively easy current conduction from an electrode thereof to a common circuit node and each connected at its said electrode to a different one of the input circuits of said electronic switch devices;

a capacitance between said common circuit node and a reference potential, said capacitance being of a value to integrate any transient current pulse of shorter duration than said COMMAND pulse which transient current pulse is undesirably coupled to the input circuit of any one of said electronic switch devices and tends to cause the potential across the input circuit of said any one of said electronic switch devices to exceed the potential then present across the input circuit of each other of said electronic switch devices, whereby the likelihood of such shorter duration pulse causing a control potential larger than said threshold value is substantially diminished.

6. In integrated circuitry built upon a common substrate and having a plurality of conductors for parallelly applied pulse signals, a transient suppressor comprising:

a plurality of lateral structure transistors having joined bases and joined collectors, said transistors having respective emitter electrodes connected to respective ones of said conductors where transient current pulses may occur which transient pulses are short-lived as compared to said pulse signals and the combined base-to-substrate capacitances of the transistors being free to integrate such transient current pulses and thereby reduce their amplitudes relative to the amplitudes of said pulse signals.

7. In integrated circuitry built upon a common substrate and having a plurality of conductors for parallelly applied pulse signals, a transient suppressor comprising:

a plurality of transistors having joined base regions and joined collector regions, one type of said regions being disposed upon said substrate and having the other type of regions disposed therewithin, said transistors having respective emitter regions disposed in their base regions to form base-emitter junctions, which emitter regions are ohmically contacted and connected to respective ones of said plurality of conductors where transient pulses short lived as compared to said pulse signals may occur, said base-emitter junctions providing a diode OR gate for selectively connecting such of said plurality of conductors upon which a pulse occurs to the combined base-to-substrate and collector-to-substrate capacitances of said transistors.

* * * * *